United States Patent [19]

Morita et al.

[11] 4,239,350
[45] Dec. 16, 1980

[54] ELECTROCHROMIC DISPLAY DEVICE

[75] Inventors: Hiroshi Morita, Tokyo; Hiroshi Washida, Yokohama, both of Japan

[73] Assignee: Tokyo Shibaura Denki Kabushiki Kaisha, Kawasaki, Japan

[21] Appl. No.: 31,877

[22] Filed: Apr. 18, 1979

[30] Foreign Application Priority Data

Apr. 24, 1978 [JP] Japan .................. 53-47684
Apr. 24, 1978 [JP] Japan .................. 53-47687

[51] Int. Cl.³ .............................................. G02F 1/17
[52] U.S. Cl. ................................................... 350/357
[58] Field of Search ........................................ 350/357

[56] References Cited

U.S. PATENT DOCUMENTS

| 3,712,710 | 1/1973 | Castellion et al. | 350/357 |
| 4,120,568 | 10/1978 | Deb et al. | 350/357 |
| 4,175,837 | 11/1979 | Inami et al. | 350/357 |

OTHER PUBLICATIONS

Sichel et al., "Electrochromism in the Composite Material Au-WO₃", *Applied Physics Letters*, vol. 31, No. 2, Jul. 15, 1977, pp. 109-111.

Schirmer et al., "Dependence of WO₃ Electrochromic Absorption on Crystallinity", *Journal of Electrochemical Society*, vol. 124, No. 5, May 1977, pp. 749-753.

*Primary Examiner*—James W. Davie
*Attorney, Agent, or Firm*—Cushman, Darby & Cushman

[57] ABSTRACT

An electrochromic display device comprises a display electrode, a counter electrode spaced from the display electrode, an electrolyte filled in the space between the display and counter electrodes, a first coloring layer formed on the display electrode and a second coloring layer laid on the first coloring layer. The first coloring layer is a crystalline layer containing electrochromic material and having a specific pattern. The second coloring layer is an amorphous layer containing electrochromic material.

9 Claims, 2 Drawing Figures

ELECTROCHROMIC DISPLAY DEVICE

BACKGROUND OF THE INVENTION

This invention relates to an improved display device utilizing electrochromic phenomenon.

Some substances are colored if applied with electric current. This coloring is called "electrochromic phenomenon", and substances undergoing this phenomenon are called "electrochromic material". The color of an electrochromic material is bleached by flow of current in the reverse direction. The electrochromic phenomenon is generally thought to accompany formation of color centers or oxidation-reduction reaction.

Organic and inorganic electrochromic materials are known. U.S. Pat. No. 3,806,229 names a viologen salt as a typical organic electrochromic material. U.S. Pat. No. 3,712,710 discloses oxides of transition metals such as tungsten oxide and molybdenum oxide as typical inorganic electrochromic material. Generally, these metal oxides are used together with electrolytes such as sulfuric acid, phosphoric acid and lithium perchlorate solution.

Recently, many attempts have been made to apply the electrochromic phenomenon to a display cell. Such a display cell is so constructed as shown in the appended FIG. 1. A coloring region 1 comprising an electrochromic layer and an electrolyte is formed between a pair of electrodes 2 and 3. The electrode 2 is constituted by a transparent conductive film 4 contacting the coloring region 1 and a transparent substrate 5 on which the film 4 is formed. The film 4 is cut to have a pattern denoting numerals, letters, symbols, etc, and the substrate 5 is a glass pate or the like. Likewise, the electrode 3 is constituted by a substrate 6 and a conductive film 7 formed on the substrate 6 and contacting the coloring region 1. A spacer 8 of an insulating material is provided between the electrodes 2 and 3 and contacting the periphery of the coloring region 1. Between the electrodes 2 and 3, voltage is applied reversibly by actuating a switch 9 connected to a power source 10, thereby to color and bleach the coloring region 1 alternatively. The display cell becomes a transmission type if the substrate 6 and film 7 of the electrode 3 are formed of transparent material. It becomes a reflection type if the electrode 3 is formed of opaque material or if a colored background sheet is stretched within the electrolyte. If the conductive film 7 is made transparent, indium oxide, tin oxide etc. are suitable materials. If the film 7 is made opaque, stainless steel, tantalum, platinum etc. may be used.

In general, an electrochromic material absorbs ambient light to perform a so-called "passive display" which depends on the color density. Owing to the passive display, eyes do not get tired, and the letters etc. displayed can be seen clearly regardless of visual angle. In addition, the color displayed does not disappear even if the display cell has been turned off because the display cell works as a memory device. Because of these advantages, the electrochromic display device is expected to be employed in various fields.

The conventional electrochromic display device is, however, not satisfactorily durable. This is because that part of the electrochromic material (e.g. WO$_3$) in which electric field is likely to concentrate will be dissolved after the switch has been actuated about 10$^6$ times to color and bleach the electrochromic material. As a result, the electrodes are exposed to the electrolyte and eventually reduced and dissolved by the electrolyte, whereby the display cell ceases functioning.

SUMMARY OF THE INVENTION

It is an object of this invention to provide an electrochromic display device which is long durable and highly responsive.

According to this invention, there is provided an electrochromic display device which comprises: a display electrode; a counter electrode spaced from the display electrode; an electrolyte filled in the space between the display and counter electrodes; a first coloring crystalline layer formed on the display electrode, containing electrochromic material and having a specific pattern; and a second coloring amorphous layer laid on the first coloring layer and containing electrochromic material.

DETAILED DESCRIPTION OF THE PREFERRED EMBODIMENT

Figure 1:
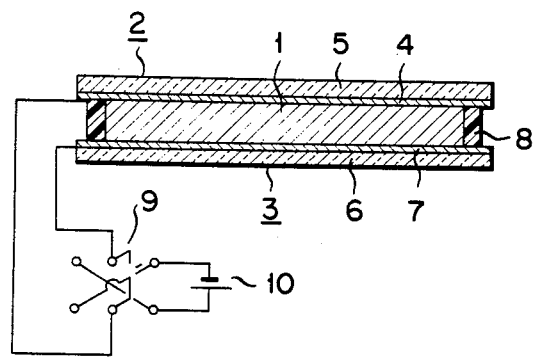
FIG. 1 is a cross sectional view of a known electrochromic display device.
Figure 2:
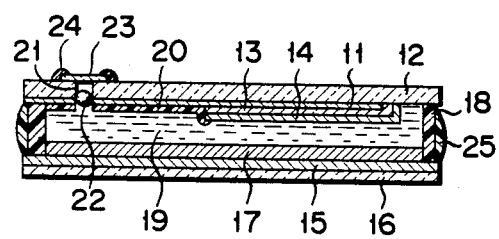
FIG. 2 is a cross sectional view of an electrochromic display device according to this invention.

Referring to FIG. 2, an embodiment of this invention will be described.

As shown in FIG. 2, the device comprises a display electrode 11 made of tin oxide. The electrode 11 is formed in a known method to have a desired pattern on a substrate 12 made of transparent material such as glass. On that area of the display electrode 11 which will serve as display area there is formed a first coloring layer 13 1000 Å thick. The layer 13 is a crystalline layer containing tungsten oxide as electrochromic material. On the first coloring layer 13 a second coloring layer 14 is laid 2000 Å thick. The layer 14 is an amorphous layer made of tungsten oxide as electrochromic material. A counter electrode 15 made of tantalum is provided at a specific distance from the display electrode 11. The counter electrode 15 is formed 3000 Å thick by sputtering on a glass substrate 16. On the entire surface of the electrode 15 a counter coloring layer 17 of tungsten oxide is formed 3000 Å thick by evaporation. A spacer 18 made of Tefron and 1 mm thick is provided between the substrates 12 and 16, thus defining an enclosed space therebetween. This space is filled with an electrolyte 19.

The electrolyte 19 is a gel mixture of sulfuric acid and glycerin (mixing ratio 1:5), containing TiO$_2$ powder which forms a display background. This electrolyte 19 serves to cause electrochromic phenomenon, which is thought to accompany formation of color centers achieved by such a simultaneous injection of electrons and H$^+$ ions into tungsten oxide as expressed by the following reaction formula:

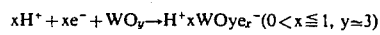

$$xH^+ + xe^- + WO_y \rightarrow H^+_x WO_y e_x^- \; (0 < x \leqq 1, \; y \approx 3)$$

On the surface of the display electrode 11, except for the display area, a transparent insulative layer 20 is formed to protect said surface of the electrode 11 from the electrolyte 19. The transparent insulative layer 20 is made of, for example, silicone varnish TSR-144 manufactured by Toshiba Silicone Co., Ltd. The counter coloring layer 17 is permanently colored a little by applying current to the electrolyte 19.

The electrochromic display device is further provided with a port 21 through which the electrolyte 19 already dehydrated is poured into the above-mentioned space. Once the space has been filled up with the electrolyte 19, the port 21 is plugged with a glass ball 22 and is then closed with a glass plate 23 and a mass 24 of epoxy resin.

The first coloring layer 13 may be formed in the following steps. First, in vacuum of $10^{-5}$ torr $WO_3$ is electrically heated, evaporated and thus deposited on a substrate heated to 200° C. Then, in an atomsphere air the resultant vacuum deposition film of $WO_3$ is kept heated at 340° C. to 400° C. for one hour. Or the first coloring layer 13 may be manufactured by a RF-sputtering of a $WO_3$ target in an argon temperature of $10^{-2}$ torr.

The first coloring layer 13 can be more preferably a cermet film made of tungsten oxide and platinum. The cermet film is manufactured by a RF-sputtering of a hotpress-molded tungsten oxide cermet target containing 5 mol of platinum, in an argon atmosphere of $10^{-2}$ torr containing 10% of oxygen.

The crystallinity of the first coloring layer 13 can be ascertained by X-ray diffraction. Besides tungsten oxide, molybdenum oxide may be used as electrochromic material.

The second coloring layer is formed by vacuum deposition in the following manner. In vacuum of $10^{-5}$ torr, $WO_3$ is electrically heated, evaporated and deposited on a substrate while heating the substrate to 200° C. The second coloring layer 14 thus formed is provided to be amorphous if examined by X-ray diffraction.

Many first and second coloring layers were made in the above-described methods. The weight and volume of each coloring layer were measured to detect the density thereof. It was then found that preferable density was 7.0 to 7.5 $g/cm^3$ for the first coloring layer and 5.5 to 6.5 $g/cm^3$ for the second coloring layer. If the first coloring layer has a density of less than 7.0 $g/cm^3$, it fails to protect sufficiently the display electrode 11 against the electrolyte. If its density is more than 7.5 $g/cm^3$, the first coloring has its coloring response much reduced. If formed by a low vacuum deposition in an inert gas atmosphere, the second coloring layer has a density less than 5.5 $g/cm^3$. Such second coloring layer exhibits an improved coloring response since its surface area is expanded, but it fails to be sufficiently protected from peeling caused by electrolyte. If formed by heating a $WO_3$ layer prepared by evaporation, the second coloring layer has a density more than 6.5 $g/cm^3$. Such second coloring layer has its coloring response reduced inevitably because the density approaches to that of the first coloring layer.

The electrochromic display device of the above-described construction was sharply colored and bleached when it was applied alternately with +1 V and −1 V every 0.5 second. Coloring and bleaching were repeated on the device every second, applying +1 V and −1 V, and it was ascertained that the device showed a good coloring-bleaching characteristics after the constant voltage had been applied to it more than $1 \times 10^7$ times.

Electrochromic display devices of the same construction, except in that an amorphous coloring layer 3000 Å thick was provided instead of the first and second coloring layer, were made and put to the above-mentioned test. It was found that they showed a good response and satisfactorily colored until the constant voltage was applied $2 \times 10^6$ times, but their display electrode were thereafter affected by the electrolyte and ceased functioning. This is because the density of the amorphous coloring layer was too low to protect the display electrode sufficiently against the electrolyte. Further, electrochromic display devices of the same construction, except in that a crystalline coloring layer 3000 Å thick was provided instead of the first and second coloring layer, were made and put to the above-mentioned test. They failed to be colored and bleached so sharply as the device according to this invention when they were applied with +1 V and −1 V. When applied with +3 V and −3 V, they started functioning in the same manner as the device of this invention. Then they were driven with +3 V and −3 V repeatedly. The higher voltage of 3 V caused electrolysis of residual water in the display electrode and eventually caused an electrochemical reaction such as generating of hydrogen gas. Consequently, the deterioration of the display electrode started after the constant voltage had been applied $7 \times 10^5$ times, and the devices ceased functioning after the constant voltage had been applied $1 \times 10^6$ times.

What we claim is:

1. An electrochromic display device comprising:
   a display electrode;
   a counter electrode spaced from the display electrode;
   an electrolyte filled in the space between the display electrode and the counter electrode;
   a first coloring crystalline layer formed on the display electrode, containing electrochromic material and having a specific pattern; and
   a second coloring amorphous layer laid on the first coloring layer and containing electrochromic material.

2. A device according to claim 1, wherein said first coloring layer is formed of cermet.

3. A device according to claim 2, wherein said cermet layer is formed of at least one metal selected from the group consisting of gold and platinum, besides the electrochromic material.

4. A device according to claim 1, wherein said first coloring layer is obtained by heating an electrochromic layer formed by vacuum deposition.

5. A device according to claim 1, wherein said first coloring layer is formed by sputtering.

6. A device according to claim 1, wherein said second coloring layer is formed by vacuum deposition.

7. A device according to claim 1, wherein the electrochromic material forming said first and second coloring layers is tungsten oxide or molybdenum oxide.

8. A device according to claim 1, wherein said first coloring layer consists of tungsten oxide and has a density ranging from 7.0 to 7.5 $g/cm^3$.

9. A device according to claim 1, wherein said second coloring layer consists of tungsten oxide and has a density ranging from 5.5 to 6.5 $g/cm^3$.

* * * * *